(12) United States Patent
Kornienko

(10) Patent No.: US 11,094,038 B1
(45) Date of Patent: Aug. 17, 2021

(54) VARIABLE SCALING RATIO SYSTEMS AND METHODS

(71) Applicant: Apple Inc., Cupertino, CA (US)

(72) Inventor: Alexey Kornienko, Watford (GB)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/074,254

(22) Filed: Oct. 19, 2020

(51) Int. Cl.
*G06T 3/40* (2006.01)
*G06T 5/00* (2006.01)
*G09G 5/373* (2006.01)

(52) U.S. Cl.
CPC ............... *G06T 3/40* (2013.01); *G06T 5/002* (2013.01); *G09G 5/373* (2013.01); *G09G 2340/0407* (2013.01)

(58) Field of Classification Search
CPC ... G06T 3/40; G09G 5/373; G09G 2340/0407
See application file for complete search history.

(56) References Cited

U.S. PATENT DOCUMENTS

| | | | | |
|---|---|---|---|---|
| 6,825,857 | B2* | 11/2004 | Harasimiuk | G06T 3/4023 345/505 |
| 7,219,309 | B2* | 5/2007 | Kaasila | G06F 16/9577 715/800 |
| 7,221,381 | B2* | 5/2007 | Brown Elliott | G09G 3/20 345/12 |
| 2007/0216687 | A1* | 9/2007 | Kaasila | G09G 5/026 345/441 |
| 2012/0182441 | A1* | 7/2012 | Sharman | G06T 3/4007 348/222.1 |
| 2018/0005343 | A1* | 1/2018 | Rhoads | G06T 1/0092 |
| 2020/0175647 | A1* | 6/2020 | Kim | G06T 5/50 |

* cited by examiner

*Primary Examiner* — David T Welch
(74) *Attorney, Agent, or Firm* — Fletcher Yoder, P.C.

(57) ABSTRACT

An electronic device may include an electronic display to display an image based on scaled image data and variable scaling circuitry to generate the scaled image data. Generating the scaled image data may include receiving input pixel values in a first resolution and determining multiple tap point locations based on a scaling ratio to be applied to the input pixel values. Generating the scaled image data may also include determining weighting coefficients based on a scaling curve and the tap point locations, and weighting the input pixel values based on the weighting coefficients. The variable scaling circuitry may generate the scaled image data at a second resolution based on the aggregation of the weighted input pixel values.

20 Claims, 9 Drawing Sheets

VARIABLE SCALING RATIO SYSTEMS AND METHODS

BACKGROUND

The present disclosure relates generally to image processing and, more particularly, to the scaling image data used to display images on an electronic display at multiple different scaling ratios.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic devices often use one or more electronic displays to present visual representations of information as text, still images, and/or video by displaying one or more images (e.g., image frames). For example, such electronic devices may include computers, mobile phones, portable media devices, tablets, televisions, virtual-reality headsets, and vehicle dashboards, among many others. To display an image, an electronic display may control light emission (e.g., luminance) of its display pixels based at least in part on corresponding image data.

Generally, image data may be associated with a resolution (e.g., an amount of pixel data values) corresponding with an image. However, in some instances, it may be desirable to scale the image to a higher or lower resolution. Further, in some scenarios, it may be desirable to scale different portions of the image using different scales. Thus, before being used to display an image, the image data may be processed to convert the image data using the desired scaling ratios at different positions of an image frame. However, at least in some instances, techniques used to scale image data may affect perceived image quality of the corresponding image, for example, by introducing image artifacts such as jagged edges, aliasing, and/or other visual anomalies. Aspects of the present application may be used to scale image data with a variable scaling ratio while reducing or eliminating perceivable artifacts.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

To improve image quality while scaling at multiple resolutions, variable scaling coefficients corresponding to the spatially varying scaling ratio, may be generated while reducing or eliminating image artifacts introduced by the scaling. Indeed, some instances, it may be desirable to scale image data to a higher or lower resolution, for example to match the resolution of an electronic display, to make the image appear larger or smaller, and/or account for physical effects of the environment such as lenses or other optical distortions. In particular, it may be desirable to scale different portions of the image data using different scaling ratios. However, at least in some instances, this may affect image quality. For example, when utilizing constant weighting coefficients for different scaling ratios, perceivable visual artifacts, such as blurriness, aliasing, jagged edges (e.g., staircasing), and/or loss of detail may incur. As such, the image processing circuitry, implemented via hardware (e.g., circuitry) and/or software (e.g., execution of instructions stored in tangible, non-transitory, media), may facilitate image processing to spatially vary the scaling of the image.

Accordingly, to improve image quality, the present disclosure provides techniques for using a variable scaling ratio across a frame of image data with reduced image artifacts by utilizing a scaling curve to adjust the weighting coefficients for different scaling ratios. During scaling, a given scaled pixel value may be determined by a weighted average of multiple input pixel values using respective weighting coefficients. By utilizing a weighted average of the multiple input pixel values, the scaled pixel values may be better suited to represent the original image at the desired scale. Moreover, utilizing different weighting coefficients for different scaling ratios in the same image frame may reduce image artifacts. In some embodiments, a scaling curve may be utilized to determine the weighting coefficients based on the scaling ratio. For example, in some embodiments, the scaling curve may be sampled at different positions (e.g., tap points) and/or a different number of times depending on the scaling ratio. Furthermore, the tap points may be spaced differently throughout the scaling curve depending on the scaling ratio. For example, in some embodiments, scaling ratios greater than one-to-one (e.g., upsampling) may utilize different spaced tap points than scaling ratios less than one-to-one (e.g., downsampling). Moreover, in some embodiments, the tap point spacing for upsampling may use a common spacing between tap points, while downsampling scaling ratios may use a tap point spacing directly proportional to the scaling ratio, which may be generally less than tap point spacing for upsampling.

In some scenarios, a scaled pixel value may be representative of a pixel position that does not align with a pixel grid of the input pixel values. As such, an offset may be taken into account based on the fractional coordinate of the scaled pixel value relative to the pixel grid of the input pixel values. For example, if the scaled pixel value corresponds to a pixel position that is partway between two pixel positions of the input pixel grid, the tap points on the scaling curve may be offset (e.g., at a different phase). The tap point offset may be used to adjust the weighting coefficients to account for different pixel positioning of the scaled pixel values relative to the input pixel values.

Additionally, in some embodiments, the scaling curve may be weighted by windowing the scaling curve relative to a unit phase metric. As discussed above, the tap point spacing may vary depending on the scaling ratio. As such, for a given number of tap points, the window of the scaling curve encompassing the tap points for upsampling may be larger than the window encompassing the tap points for downsampling. In some scenarios, smaller downsampling scaling ratios may incur a degradation of frequency response as compared to higher scaling ratios due to the differences in windowing. As such, in some embodiments, the scaling curve may be weighted (e.g., normalized) based on a variable or fixed weighting function or envelope to decrease the likelihood of frequency response degradation and reduce the likelihood of perceivable artifacts.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
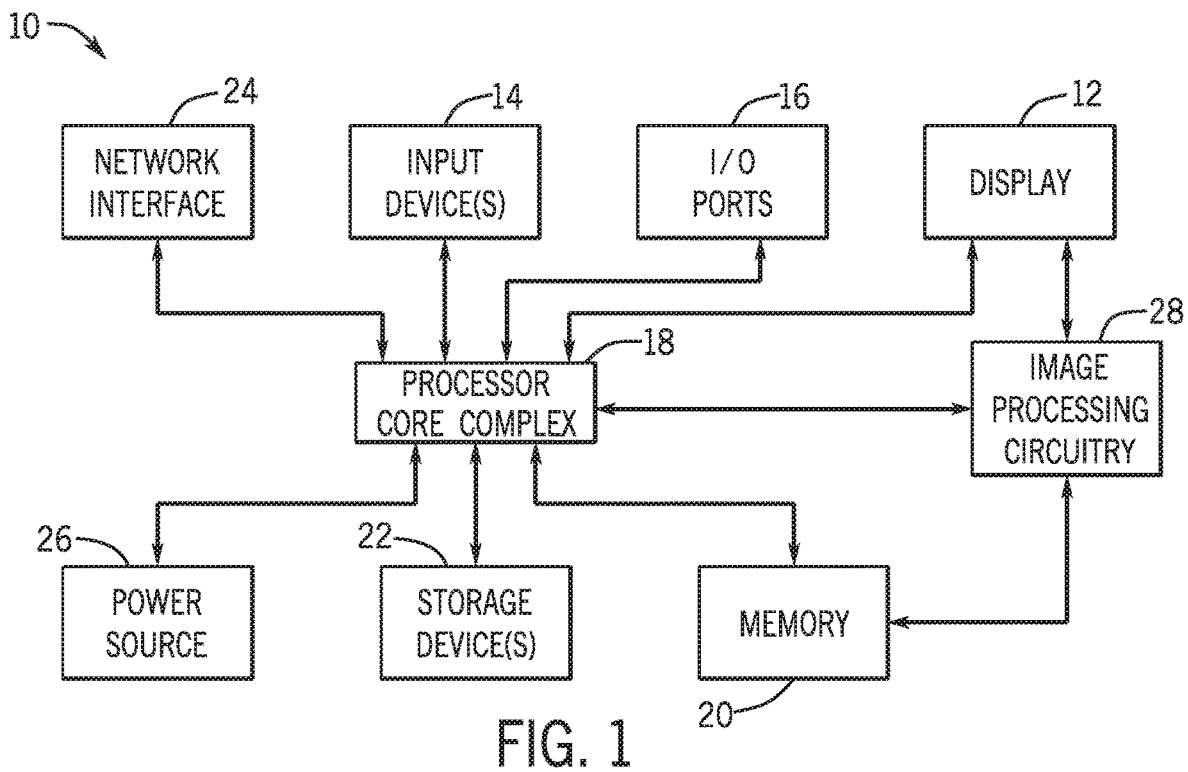
FIG. 1 is a block diagram of an electronic device that includes an electronic display, in accordance with an embodiment.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, the term "or" is intended to be inclusive (e.g., logical OR) and not exclusive (e.g., logical XOR). In other words, the phrase A "or" B is intended to mean A, B, or both A and B.

To facilitate communicating information, electronic devices often use one or more electronic displays to present visual representations of information via one or more images (e.g., image frames). Such electronic devices may include computers, mobile phones, portable media devices, tablets, televisions, virtual-reality headsets, and vehicle dashboards, among many others. Additionally or alternatively, an electronic display may take the form of a liquid crystal display (LCD), a light emitting diode (LED) display, an organic light emitting diode (OLED) display, a plasma display, or the like.

In any case, to display an image, an electronic display generally controls light emission (e.g., luminance and/or color) of its display pixels based on corresponding image data received at a particular resolution (e.g., pixel dimensions). For example, an image data source (e.g., memory, an input/output (I/O) port, and/or a communication network) may output image data as a stream of pixel data (e.g., image data), in which data for each pixel indicates a target luminance (e.g., brightness and/or color) of one or more display pixels located at corresponding pixel positions. In some embodiments, image data may indicate luminance per color component, for example, via red component image data, blue component image data, and green component image data, collectively referred to as RGB image data (e.g., RGB, sRGB). Additionally or alternatively, image data may be indicated by a luma channel and one or more chrominance channels (e.g., YCbCr, YUV, etc.), grayscale (e.g., gray level), or other color basis. It should be appreciated that a luma channel, as disclosed herein, may encompass linear, non-linear, and/or gamma corrected luma values.

To improve image quality while scaling at multiple resolutions, variable scaling coefficients corresponding to the spatially varying scaling ratio, may be generated while reducing or eliminating image artifacts introduced by the scaling. Indeed, some instances, it may be desirable to scale image data to a higher or lower resolution, for example to match the resolution of an electronic display, to make the image appear larger or smaller, and/or account for physical effects of the environment such as lenses or other optical distortions. In particular, it may be desirable to scale different portions of the image data using different scaling ratios. However, at least in some instances, this may affect image quality. For example, when utilizing constant weighting coefficients for different scaling ratios, perceivable visual artifacts, such as blurriness, aliasing, jagged edges (e.g., staircasing), and/or loss of detail may incur. As such, the image processing circuitry, implemented via hardware (e.g., circuitry) and/or software (e.g., execution of instructions stored in tangible, non-transitory, media), may facilitate image processing to spatially vary the scaling of the image.

Accordingly, to improve image quality, the present disclosure provides techniques for using a variable scaling ratio across a frame of image data with reduced image artifacts. During scaling, a given scaled pixel value may be determined by a weighted average of multiple input pixel values using respective weighting coefficients. By utilizing a weighted average of the multiple input pixel values, the scaled pixel values may be better suited to represent the original image at the desired scale. Moreover, utilizing different weighting coefficients for different (e.g., optimized) scaling ratios in the same image frame may reduce image artifacts. In some embodiments, a scaling curve may be utilized to determine the weighting coefficients based on the scaling ratio. For example, in some embodiments, the scaling curve may be sampled at different positions (e.g., tap points) and/or a different number of times depending on the scaling ratio. Furthermore, the tap points may be spaced differently throughout the scaling curve depending on the scaling ratio. For example, in some embodiments, scaling ratios greater than one-to-one (e.g., upsampling) may utilize different spaced tap points than scaling ratios less than one-to-one (downsampling). Moreover, in some embodiments, the tap point spacing for upsampling may use a common spacing between tap points, while downsampling scaling ratios may use a tap point spacing directly proportional to the scaling ratio, which may be generally less than tap point spacing for upsampling.

In some scenarios, the scaled pixel value may be representative of a pixel position that does not align with a pixel grid of the input pixel values. As such, an offset may be taken into account based on the fractional coordinate of the scaled pixel value relative to the pixel grid of the input pixel values. For example, if the scaled pixel value corresponds to a pixel position that is partway between two pixel positions of the input pixel grid, the tap points on the scaling curve may be offset (e.g., at a different phase). The tap point offset may be used to adjust the weighting coefficients to account for different pixel positioning of the scaled pixel values relative to the input pixel values.

Additionally, in some embodiments, the scaling curve may be weighted by windowing the scaling curve relative to a unit phase metric. As discussed above, the tap point spacing may vary depending on the scaling ratio. As such, for a given number of tap points, the window of the scaling curve encompassing the tap points for upsampling may be larger than the window encompassing the tap points for downsampling. In some scenarios, smaller downsampling scaling ratios may incur a degradation of frequency response as compared to higher scaling ratios due to the differences in windowing. As such, in some embodiments the scaling curve may be weighted based on a variable or fixed weighting function or envelope to decrease the likelihood of frequency response degradation and the likelihood of perceivable artifacts.

To help illustrate, one embodiment of an electronic device 10 that utilizes an electronic display 12 is shown in FIG. 1. As will be described in more detail below, the electronic device 10 may be any suitable electronic device, such as a handheld electronic device, a tablet electronic device, a notebook computer, and the like. Thus, it should be noted that FIG. 1 is merely one example of a particular implementation and is intended to illustrate the types of components that may be present in the electronic device 10.

The electronic device 10 may include one or more electronic displays 12, input devices 14, input/output (I/O) ports 16, a processor core complex 18 having one or more processors or processor cores, local memory 20, a main memory storage device 22, a network interface 24, a power source 26, and image processing circuitry 28. The various components described in FIG. 1 may include hardware elements (e.g., circuitry), software elements (e.g., a tangible, non-transitory computer-readable medium storing instructions), or a combination of both hardware and software elements. As should be appreciated, the various components may be combined into fewer components or separated into additional components. For example, the local memory 20 and the main memory storage device 22 may be included in a single component. Additionally, the image processing circuitry 28 (e.g., a graphics processing unit, a display image processing pipeline) may be included in the processor core complex 18.

The processor core complex 18 may be operably coupled with local memory 20 and the main memory storage device 22. The local memory 20 and/or the main memory storage device 22 may include tangible, non-transitory, computer-readable media that store instructions executable by the processor core complex 18 and/or data to be processed by the processor core complex 18. For example, the local memory 20 may include random access memory (RAM) and the main memory storage device 22 may include read only memory (ROM), rewritable non-volatile memory such as flash memory, hard drives, optical discs, and/or the like.

The processor core complex 18 may execute instructions stored in local memory 20 and/or the main memory storage device 22 to perform operations, such as generating source image data. As such, the processor core complex 18 may include one or more general purpose microprocessors, one or more application specific processors (ASICs), one or more field programmable logic arrays (FPGAs), or any combination thereof.

The network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network.

The power source 26 may provide electrical power to operate the processor core complex 18 and/or other components in the electronic device 10. Thus, the power source 26 may include any suitable source of energy, such as a rechargeable lithium polymer (Li-poly) battery and/or an alternating current (AC) power converter.

The I/O ports 16 may enable the electronic device 10 to interface with various other electronic devices. The input devices 14 may enable a user to interact with the electronic device 10. For example, the input devices 14 may include buttons, keyboards, mice, trackpads, and the like. Additionally or alternatively, the electronic display 12 may include touch sensing components that enable user inputs to the electronic device 10 by detecting occurrence and/or position of an object touching its screen (e.g., surface of the electronic display 12).

The electronic display 12 may display a graphical user interface (GUI) of an operating system, an application interface, text, a still image, or video content. To facilitate displaying images, the electronic display 12 may include a display panel with one or more display pixels. Additionally, each display pixel may include one or more sub-pixels, which each control the luminance of a color component (e.g., red, green, or blue). As used herein, a display pixel may refer to a collection of sub-pixels (e.g., one red, green, and blue subpixel) or may refer to a single sub-pixel.

As described above, the electronic display 12 may display an image by controlling the luminance of the sub-pixels based at least in part on corresponding image data (e.g., image pixel image data and/or display pixel image data). In some embodiments, the image data may be received from another electronic device, for example, via the network interface 24 and/or the I/O ports 16. Additionally or alternatively, the image data may be generated by the processor core complex 18 and/or the image processing circuitry 28. Moreover, in some embodiments, the electronic device 10 may include multiple electronic displays 12 and/or may perform image processing (e.g., via the image processing circuitry 28) for one or more external electronic displays 12, such as connected via the network interface 24 and/or the I/O ports 16.

Figure 2:
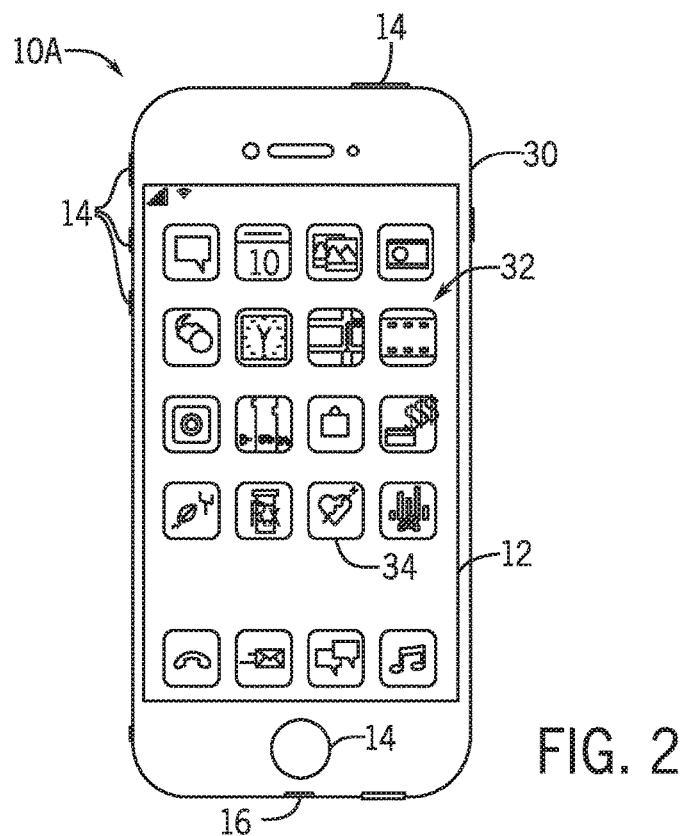
FIG. 2 is an example of the electronic device of FIG. 1 in the form of a handheld device, in accordance with an embodiment.

The electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For example, the handheld device 10A may be a smart phone, such as any iPhone® model available from Apple Inc.

The handheld device 10A may include an enclosure 30 (e.g., housing) to, for example, protect interior components from physical damage and/or shield them from electromagnetic interference. Additionally, the enclosure 30 may surround, at least partially, the electronic display 12. In the depicted embodiment, the electronic display 12 is displaying a graphical user interface (GUI) 32 having an array of icons 34. By way of example, when an icon 34 is selected either by an input device 14 or a touch-sensing component of the electronic display 12, an application program may launch.

Furthermore, input devices 14 may be provided through openings in the enclosure 30. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. Moreover, the I/O ports 16 may also open through the enclosure 30.

Figure 3:
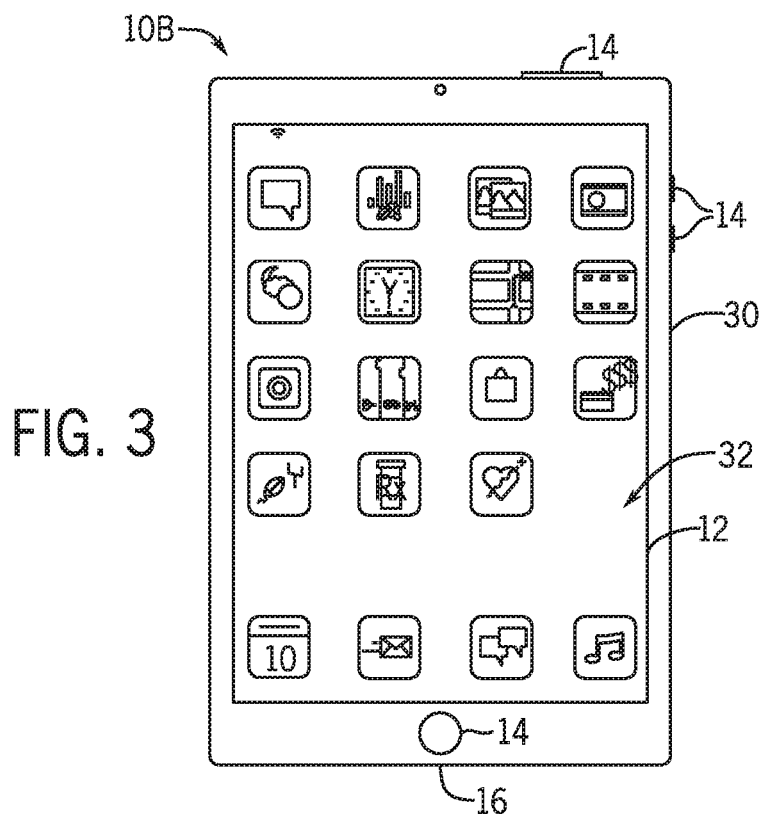
FIG. 3 is another example of the electronic device of FIG. 1 in the form of a tablet device, in accordance with an embodiment.
Figure 4:
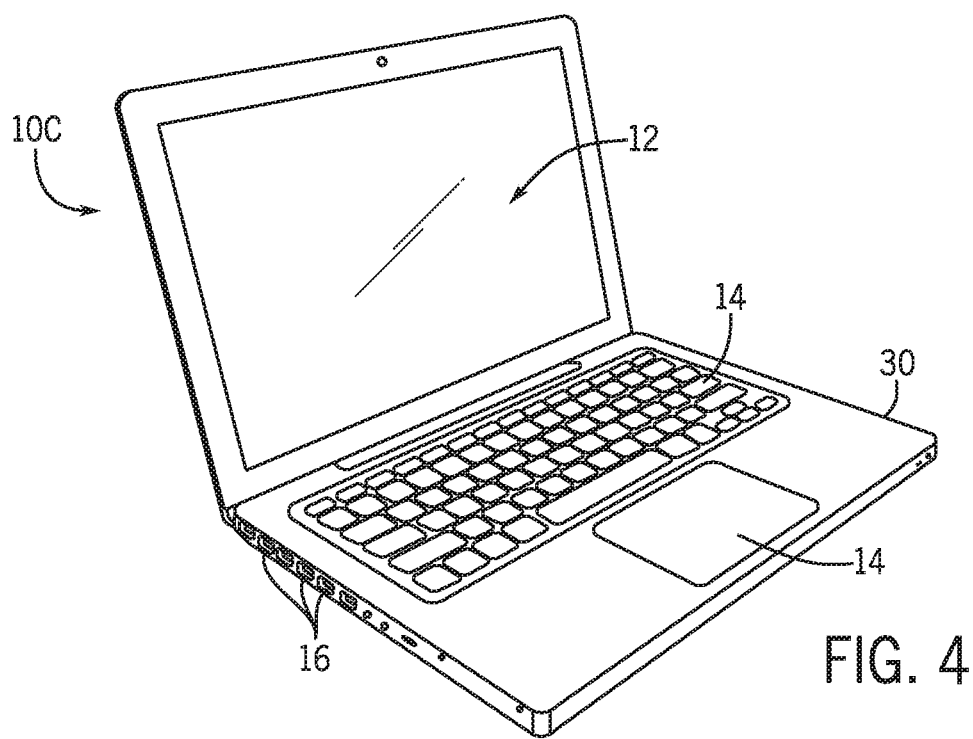
FIG. 4 is another example of the electronic device of FIG. 1 in the form of a computer, in accordance with an embodiment.
Figure 5:
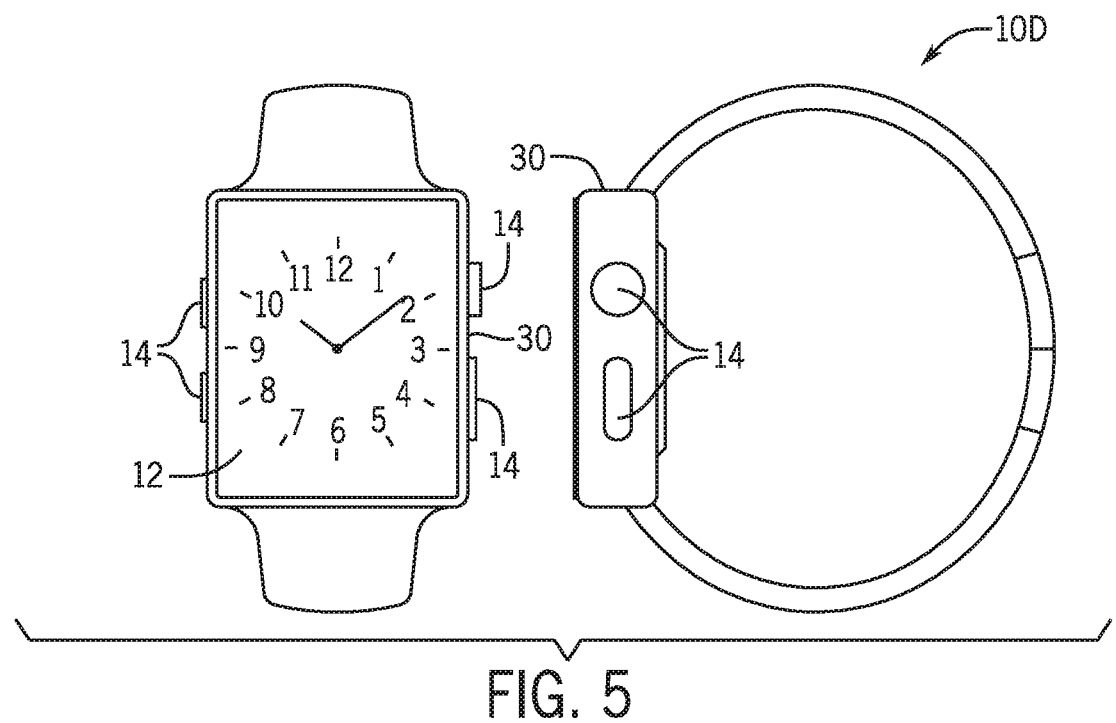
FIG. 5 is another example of the electronic device of FIG. 1 in the form of a watch, in accordance with an embodiment.

Another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any MacBook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 30.

As described above, the electronic display 12 may display images based at least in part on image data. Before being used to display a corresponding image on the electronic display 12, the image data may be processed, for example, via a memory-to-memory scaler and rotator (MSR) and/or a display pipeline.

Figure 6:
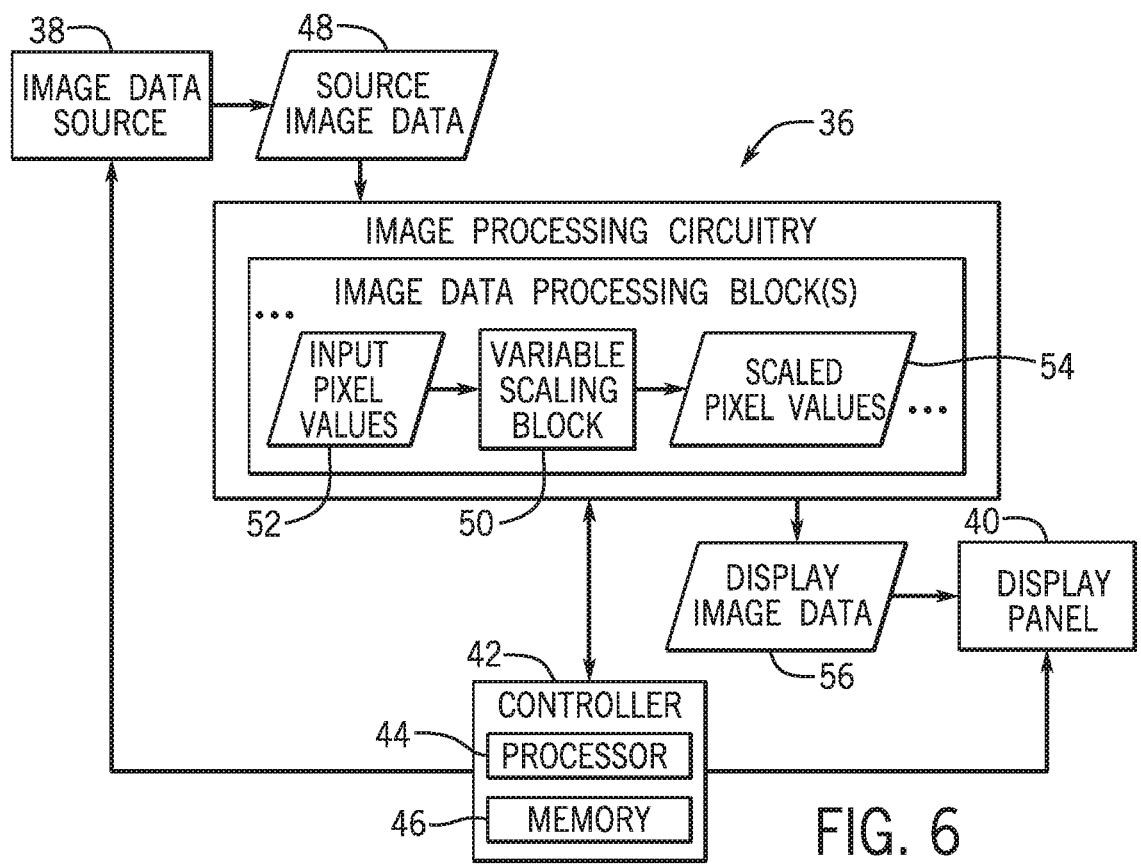
FIG. 6 is a block diagram of image processing circuitry of the electronic device of FIG. 1 including a variable scaling block, in accordance with an embodiment.

To help illustrate, a portion of the electronic device 10, including image processing circuitry 36, is shown in FIG. 6. In some embodiments, the image processing circuitry 36 may be implemented by circuitry in the electronic device 10, circuitry in the electronic display 12, or a combination thereof. For example, the image processing circuitry 36 may be included in the processor core complex 18, the image processing circuitry 28, a timing controller (TCON) in the electronic display 12, or any combination thereof. As should be appreciated, although image processing is discussed herein as being performed via a number of image data processing blocks, embodiments may include hardware or software components to carry out the techniques discussed herein.

The electronic device 10 may also include an image data source 38, a display panel 40, and/or a controller 42 in communication with the image processing circuitry 36. In some embodiments, the display panel 40 of the electronic display 12 may be a liquid crystal display (LCD), a light emitting diode (LED) display, an organic LED (OLED) display, or any other suitable type of display panel 40. In some embodiments, the controller 42 may control operation of the image processing circuitry 36, the image data source 38, and/or the display panel 40. To facilitate controlling operation, the controller 42 may include a controller processor 44 and/or controller memory 46. In some embodiments, the controller processor 44 may be included in the processor core complex 18, the image processing circuitry 28, a timing controller in the electronic display 12, a separate processing module, or any combination thereof and execute instructions stored in the controller memory 46. Additionally, in some embodiments, the controller memory 46 may be included in the local memory 20, the main memory storage device 22, a separate tangible, non-transitory, computer-readable medium, or any combination thereof.

The image processing circuitry 36 may receive source image data 48 corresponding to a desired image to be displayed on the electronic display 12 from the image data source 38. The source image data 48 may indicate target characteristics (e.g., pixel data) corresponding to the desired image using any suitable source format, such as an 8-bit fixed point aRGB format, a 10-bit fixed point aRGB format, a signed 16-bit floating point aRGB format, an 8-bit fixed point YCbCr format, a 10-bit fixed point YCbCr format, a 12-bit fixed point YCbCr format, and/or the like. In some embodiments, the image data source 38 may be included in the processor core complex 18, the image processing circuitry 28, or a combination thereof. Furthermore, the source image data 48 may reside in a linear color space, a gamma-corrected color space, or any other suitable color space. As used herein, pixels or pixel data may refer to a grouping of sub-pixels (e.g., individual color component pixels such as red, green, and blue) or the sub-pixels themselves.

As described above, the image processing circuitry 36 may operate to process source image data 48 received from the image data source 38. The image processing circuitry 36 may include one or more image data processing blocks (e.g., circuitry, modules, or processing stages) such as the variable scaling block 50. As should be appreciated, multiple other image data processing blocks may also be incorporated into the image processing circuitry 36, such as a color management block, a dither block, a rotate block, etc. Further, the functions (e.g., operations) performed by the image processing circuitry 36 may be divided between various image data processing blocks, and while the term "block" is used herein, there may or may not be a logical separation between the image data processing blocks.

The variable scaling block 50 may facilitate improving perceived image quality by scaling different portions of an image frame at different scaling ratios with reduced or eliminated perceivable artifacts, such as blurriness, aliasing, jagged edges (e.g., staircasing), and/or loss of detail. Variable scaling may be desirable to, for example, scale an image to appear larger or smaller in different areas. Additionally or alternatively, variable scaling may help account for physical effects of the environment of the display panel 40 such as lenses or other optical distortions. For example, glass or other optical material between a display panel 40 and a viewer may cause inconsistent indexes of refraction that, in turn, cause perceivable minimizing or magnification of different portions of an image. As such, compensating for the optical distortions may help reduce perceived artifacts and improve image quality.

In general, the variable scaling block 50 may receive input pixel values 52 and output scaled pixel values 54. In some embodiments, the variable scaling block 50 may output the scaled pixel values 54 in a format (e.g., digital format and/or resolution) interpretable by the display panel 40. Moreover, in some embodiments, additional image data processing blocks may be utilized to further process the scaled pixel values 54 and generate the display image data 56 for transmission to the display panel 40.

Figure 7:
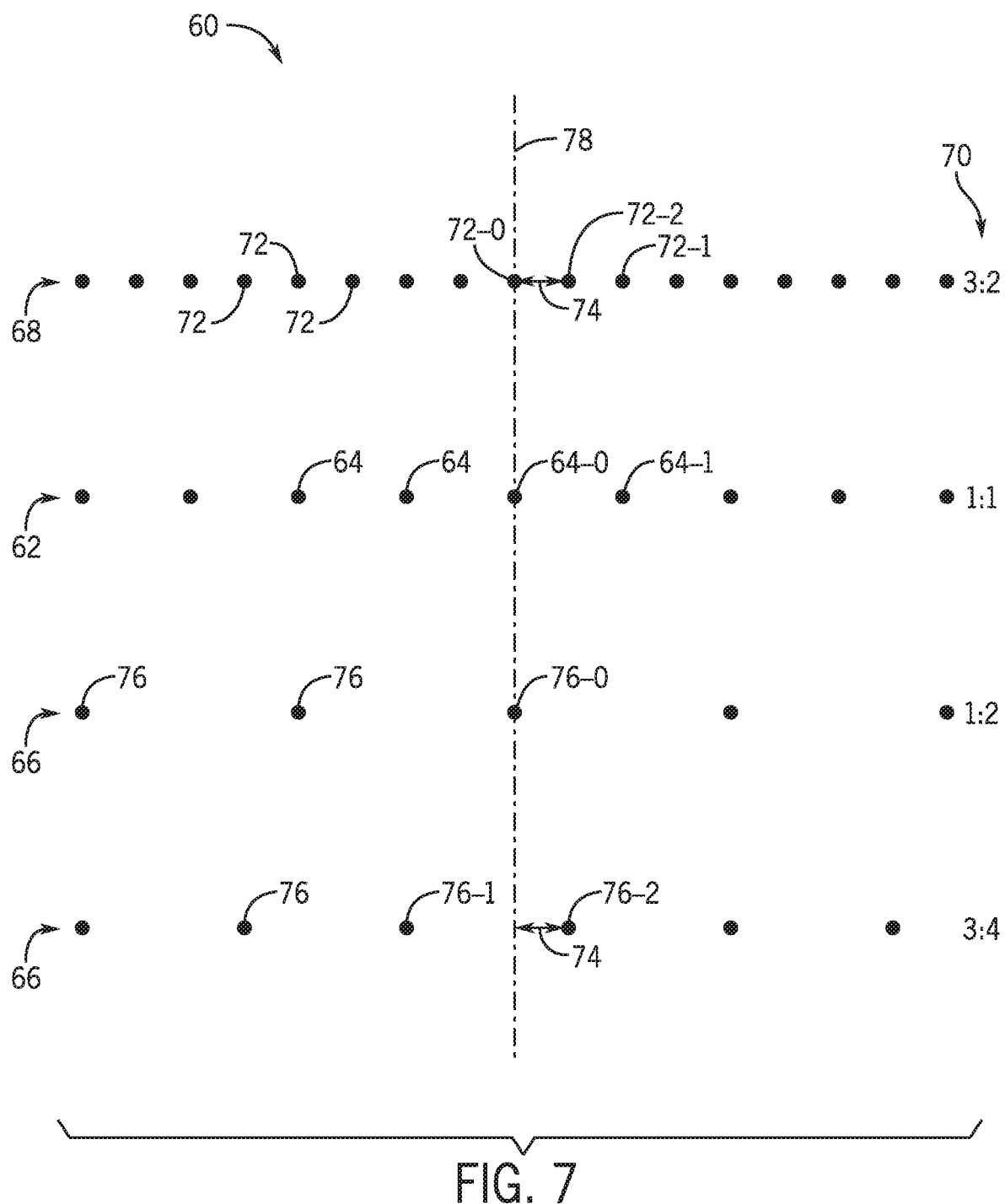
FIG. 7 is a schematic diagram of pixel grids at different scaling ratios, in accordance with an embodiment.

As discussed herein, it may be desirable to scale image data to a higher or lower resolution in certain portions of an image frame. To help illustrate, FIG. 7 shows multiple pixel grids 60 at different resolutions (e.g., pixel location densities). As should be appreciated, although illustrated and discussed in a single dimension, aspects of the present techniques may be utilized in multiple different directions/dimensions. For example, a pixel grid 60 may generally include a 2-dimensional layout of pixels. Moreover, in some embodiments, the variable scaling block 50 may operate horizontally, vertically, diagonally, and/or interpolate (e.g., via a weighted average) between multiple directions.

The input pixel values 52 may generally be associated with an input grid 62 having input pixel locations 64 spaced out according to the resolution of the source image data 48. Further, scaling may result in downsampled grids 66 or upsampled grids 68 depending on the scaling ratio 70 applied. Moreover, in some embodiments, scaling may occur at a one-to-one ratio, resampling the input grid 62 at the same input pixel locations 64 or offset locations. As should be appreciated, the pixel grids 60 of FIG. 7 are shown for example purposes and are, therefore, non-limiting. Indeed, the present techniques may be used with any suitable scaling ratio 70. Furthermore, as should be appreciated, while the pixel grids 60 are shown at different resolutions, the pixel spacing of the display panel 40 on which the display image data 56 is to be displayed may be fixed. As such, portions of the scaled pixel values 54 corresponding to upsampled grids 68 or downsampled grids 66 may appear zoomed in or zoomed out, respectively, according to their respective scaling ratios 70, which may vary spatially across the display panel 40.

In some scenarios, the upsampled grids 68 may have upsampled pixel locations 72 that are aligned with the input pixel locations 64. For example, upsampled pixel location 72-0 is aligned with input pixel location 64-0 and upsampled pixel location 72-1 is aligned with input pixel location 64-1. The scaled pixel value 54 at an upsampled pixel location 72 that is aligned with an input pixel locations 64 may be based on and/or equal to the input pixel value 52 at the input pixel location 64. As discussed further below, the scaled pixel values 54 may be based on the input pixel values 52 according to weighting coefficients derived from a scaling curve. For example the input pixel values 52 nearest a particular upsampled pixel location 72 may be weighted by weighting coefficients and summed to generate the scaled pixel value 54 at the particular upsampled pixel location 72. Additionally, some upsampled pixel locations 72 (e.g., upsampled pixel location 72-2) may include a fractional offset 74 relative to the input pixel locations 64 (e.g., input pixel location 64-0). However, the upsampled pixel locations 72 that include a fractional offset 74 (e.g., upsampled pixel location 72-2) may use different weighting coefficients than those that are aligned with input pixel locations 64 (e.g., upsampled pixel location 72-0 is aligned with input pixel location 64-0). For example, the fractional offset 74 may cause a shift or offset in the scaling curve.

Similar to the upsampled pixel locations 72, downsampled pixel locations 76 may be aligned with input pixel locations 64 (e.g., downsampled pixel locations 76-0 and 76-1 are aligned with input pixel locations 64-0 and 64-1, respectively). Additionally, the downsampled pixel locations 76 may include fractional offsets 74 (e.g., such as downsampled pixel location 76-2). Furthermore, resampled pixel locations (e.g., utilizing a one-to-one scaling ratio 70) may each be aligned (e.g., in the same locations as the input pixel locations 64) or each include fractional offsets 74. As should be appreciated, alignment may refer to any suitable alignment, such as along a horizontal and/or vertical axis 78 depending on the direction of scaling.

Figure 8:
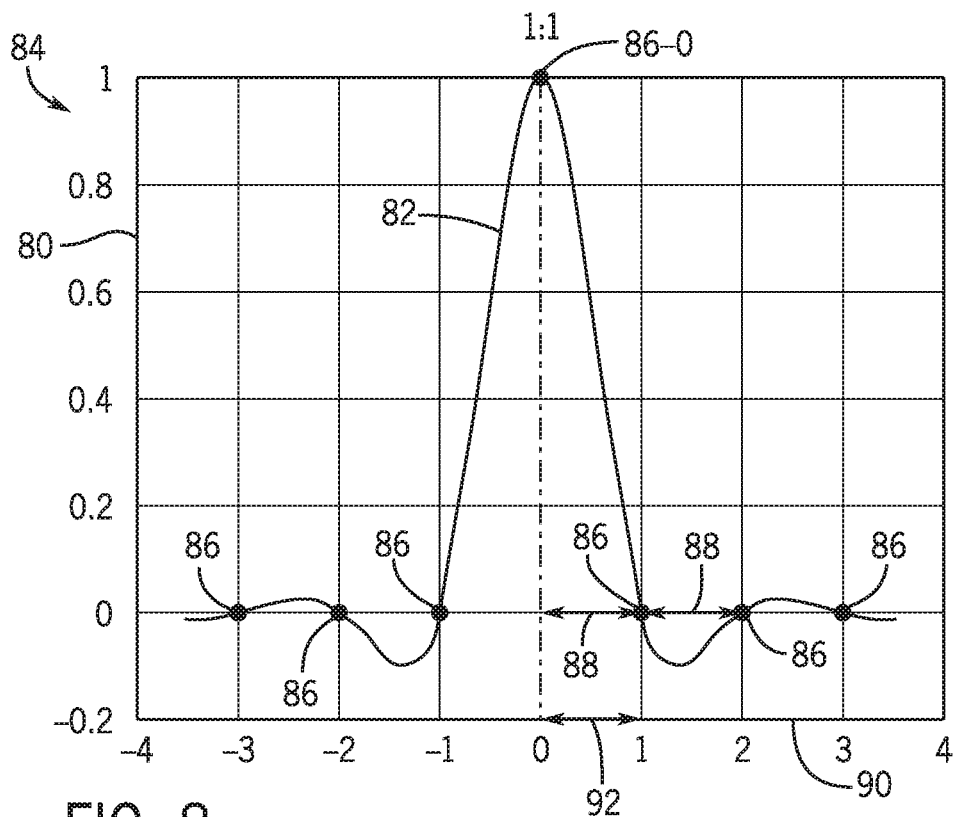
FIG. 8 is a plot of an example scaling curve used by the variable scaling block of FIG. 6, in accordance with an embodiment.

To determine the weighting coefficients 80, the variable scaling block 50 may implement a scaling curve 82 as exampled in the plot 84 of FIG. 8. As should be appreciated, the variable scaling block 50 may perform calculations of the weighting coefficients 80 based on the scaling curve 82 via dedicated circuitry, software, and/or firmware. Moreover, while discussed herein as a curve, the scaling curve 82 may be stored and/or utilized by the variable scaling block 50 as an equation and/or look-up-table (LUT). Furthermore, as should be appreciated, the scaling curve 82 may depend on implementation factors such as the type of display panel 40, the resolution of the display panel 40, an operating frequency of the display panel 40, the resolution of the source image data 48, etc. The plot 84 of FIG. 8 depicts a scaling curve 82 with tap points 86 spaced apart by a period 88 with respect to a normalized phase metric 90. As should be appreciated, the number of tap points 86 may depend on implementation factors and/or desired granularity of scaling interpolation. Moreover, in some embodiments, the scaling curve 82 may generally be symmetric about the normalized phase metric 90, which may assist in reducing resource utilization and increased efficiency.

In general, the period 88 defines a distance between the tap points 86, which may be constant or variable, and may be directly proportional to the scaling ratio 70. In some instances, the selection of the tap points 86 on the scaling curve 82 may be conceptualized as different phases (e.g., with respect to a normalized phase metric 90) separated by one or more periods 88. For example, for a given number of tap points 86 (e.g., seven) an indexed counter "i" may count (e.g., from negative three to three) periods 88 to determine the tap point locations to determine the corresponding weighting coefficients 80. In the depicted example, the scaling ratio 70 is one-to-one and the normalized phase metric 90 is normalized for a one-to-one scaling ratio 70 making the period 88 equal to a unit phase metric 92.

Figure 9:
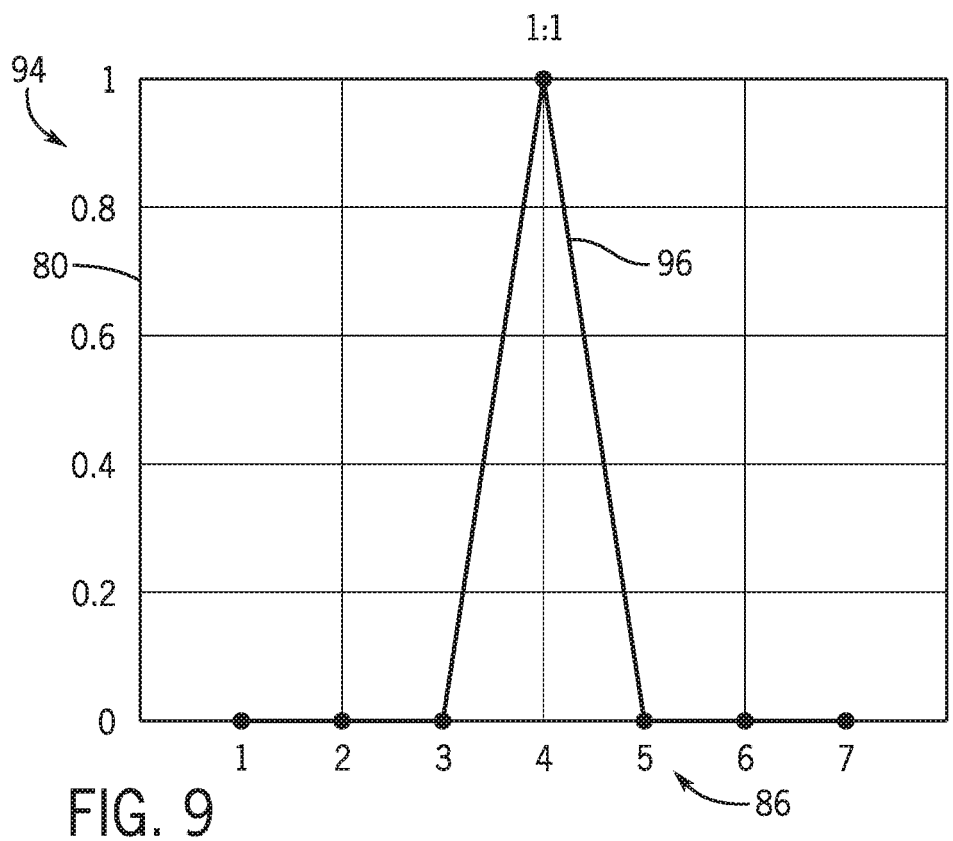
FIG. 9 is a plot of tap points of FIG. 8 for 1:1 scaling, in accordance with an embodiment.

As discussed above, in some embodiments, the scaled pixel locations (e.g., upsampled pixel locations 72, downsampled pixel locations 76, and/or resampled pixel locations, which may be the same as the input pixel locations 64 if no fractional offset 74) may be aligned with the input pixel locations 64 (e.g., on an axis 78). Such alignment may also align the tap points 86, scaling curve 82, and the normalized phase metric 90. For example, for the one-to-one scaling ratio 70, the input pixel location 64-0 may be mapped to the same location due to the alignment, and the scaled pixel value 54 at the new pixel location (e.g., input pixel location 64-0) may be determined using the weighting coefficients 80. As to be expected, the weighting coefficients 80 for a one-to-one scaling ratio 70 aligned with the input pixel locations 64 are zero except at the tap point 86-0 corresponding to the input pixel location 64-0. FIG. 9 is a plot 94 of a pulse function 96 representative of the weighting coefficients 80 of the tap points 86 of the one-to-one scaling ratio 70 of FIG. 8. For the one-to-one scaling ratio 70 example that is aligned with the input pixel locations 64, the input pixel values 52 and input pixel locations 64 are the same before and after scaling. Furthermore, for scaling ratios 70 greater than or equal to one, the number of scaled pixel values 54 is greater than or equal to the number of input pixel values 52/input pixel locations 64. As such, there are enough upsampled pixel locations 72 to account for at least each input pixel location 64 for scaling ratios 70 greater than or equal to one (e.g., upsampling or resampling), and, as such, the period 88 may be capped at the unit phase metric 92. For example, the three-to-two scaling ratio 70 may also include a period 88 equal to the unit phase metric 92. As should be appreciated, the unit phase metric 92 may be normalized to any suitable value, while maintaining the relationships with the scaling curve 82 and the period 88.

Figure 10:
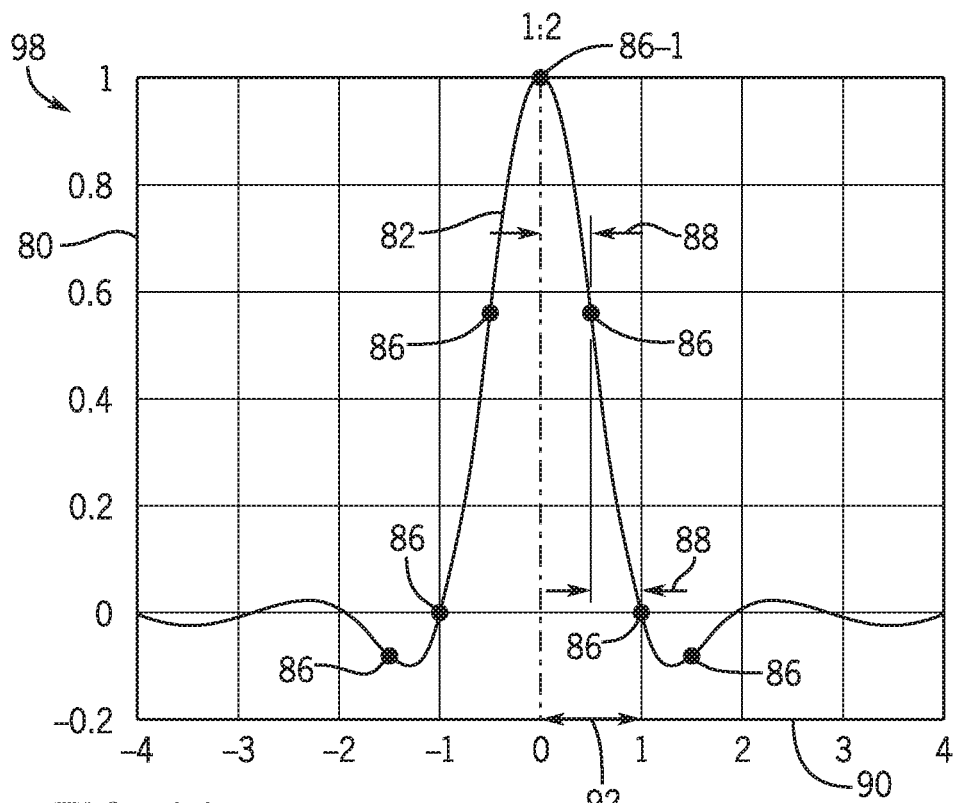
FIG. 10 is a plot of an example scaling curve used by the variable scaling block of FIG. 6, in accordance with an embodiment.
Figure 11:
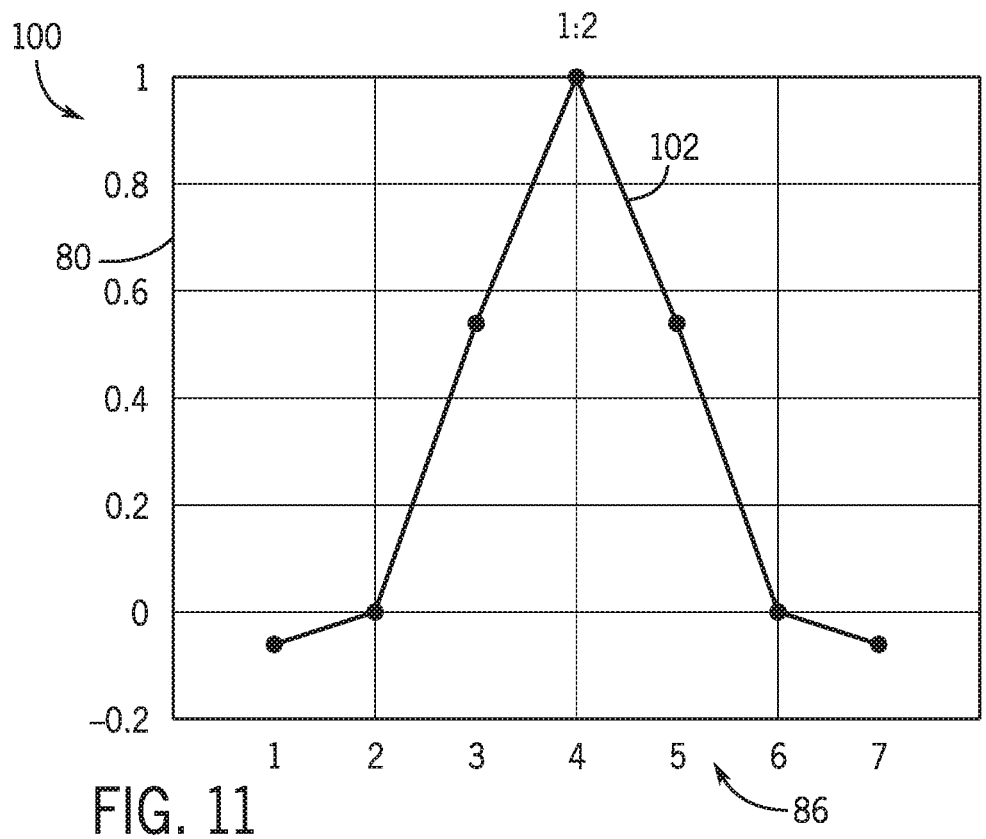
FIG. 11 is a plot of the tap points of FIG. 10 for 1:2 scaling, in accordance with an embodiment.

As discussed above, the period 88 may be directly proportional to the scaling ratio 70, but may be capped at the unit phase metric 92. For scaling ratios 70 less than one (e.g., downsampling) the period 88 may be less than the unit phase metric 92, which may make the tap points 86 closer together relative to the scaling curve 82, as shown in the plot 98 of FIG. 10. Additionally, the number of downsampled pixel locations 76 may be less than the number of input pixel locations 64, and the scaled pixel values 54 of the downsampled pixel locations 76 may include characteristics of multiple input pixel values 52 to retain the characteristics of the source image data 48. In the one-to-two scaling ratio example of FIGS. 7 and 10, the downsampled pixel location 76-0 is aligned with the input pixel location 64-0 and, as such, the tap point 86-1 associated with input pixel location 64-0 is aligned with the normalized phase metric 90. Additionally, when the scaling ratio 70 is less than one, and the period 88 is less than the unit phase metric 92, additional non-zero weighting coefficients 80 may be determined determined. For example, FIG. 11 is a plot 100 of the pulse function 102 representative of the weighting coefficients 80 of the tap points 86 of the one-to-two scaling ratio 70 of FIG. 10, which has multiple non-zero weighting coefficients 80. The weighting coefficients 80 may be multiplied by their respective input pixel values 52, aggregated, and/or normalized to generate the scaled pixel value 54. Moreover, the counting index (e.g., "i") that provides the tap points 86 when combined with the period 88 may also define which input pixel values 52 to multiply by the weighting coefficients 80. For example, for a given number of tap points 86 (e.g., seven) the index may start at three and run through zero to positive three and define the tap points 86 as discussed above as well as define the input pixel locations 64 centered at the aligned input pixel location 64.

As discussed above, upsampled, downsampled, and/or resampled pixel locations (e.g., pixel locations 64, 72, or 76) may be aligned with the input pixel locations 64 and, therefore, the central tap point (e.g., tap point 86-0 or tap point 86-1) corresponding to the aligned input pixel location 64, may be aligned with the normalized phase metric 90. However, in some scenarios, an upsampled, downsampled, or resampled pixel location (e.g., pixel locations 64, 72, or 76) may include a fractional offset 74 from a corresponding input pixel values 52. For example, returning momentarily to FIG. 7, upsampled pixel location 72-2 and downsampled pixel location 76-2 both include a fractional offset 74 from the axis 78 of the input pixel location 64-0.

Figure 12:
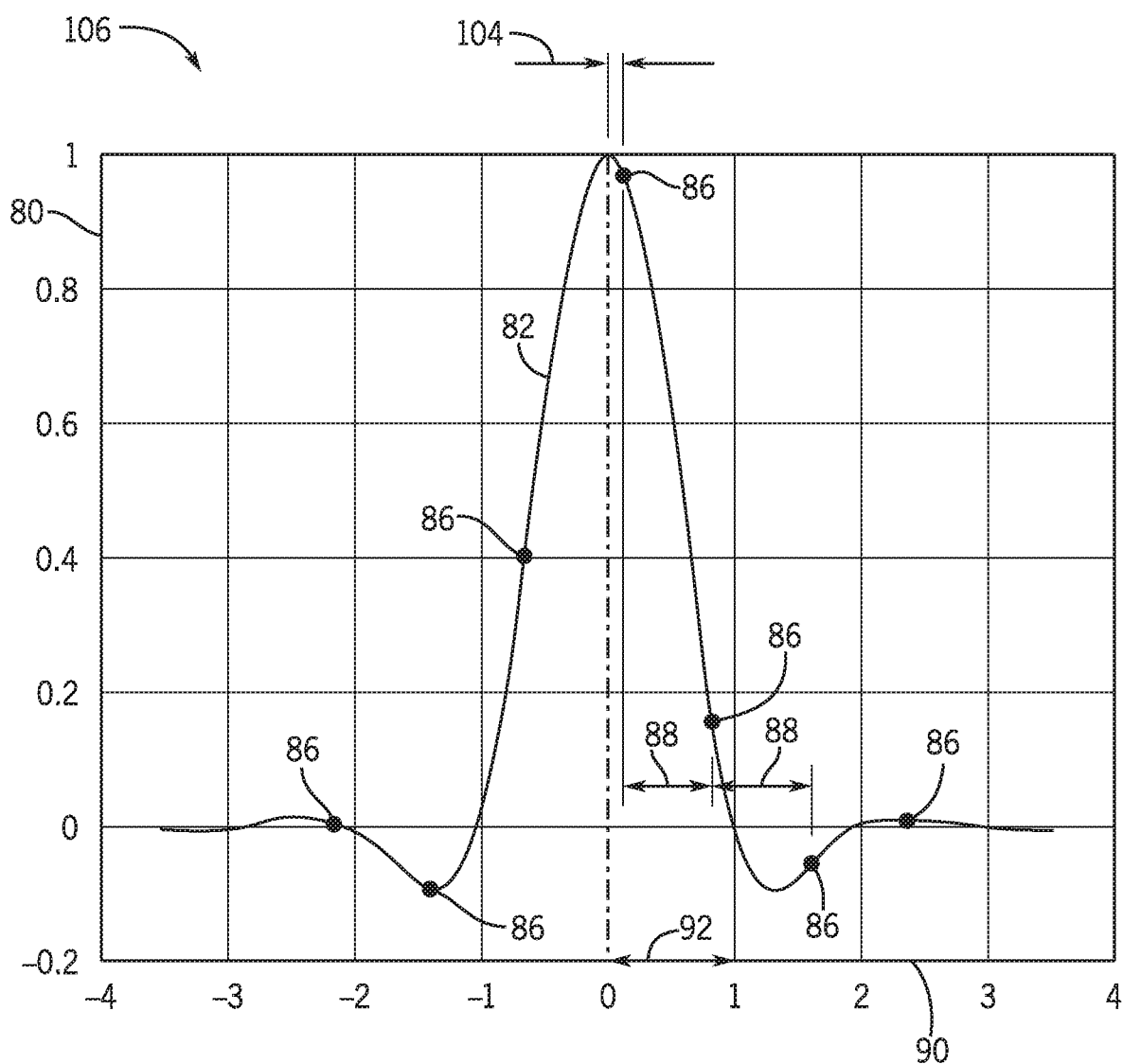
FIG. 12 is a plot of an example scaling curve used by the variable scaling block of FIG. 6, in accordance with an embodiment.

Fractional offsets 74 may occur due to non-integer level scaling and/or shifted pixel locations during scaling. Moreover, fractional offsets 74 may be taken into account by shifting the tap points 86 by a tap point offset 104 relative to the scaling curve 82 and the normalized phase metric 90, as shown in the plot 106 of FIG. 12. In some embodiments, the fractional offset 74 may be a percentage, fraction, or other measure of the intermediate distance of the scaled pixel location of interest (e.g., pixel location 72 or 76) between input pixel locations 64. In some embodiments, the tap point offset 104 calculation may be different for different tap points 86 and/or depend on implementation. For example, in some embodiments, the tap point offset 104 may be calculated differently for even indexes than odd indexes. By shifting the tap points 86 by the tap point offset 104, the weighting coefficients 80 may assist in compensating for different pixel positioning of the scaled pixel values 54 relative to the input pixel values 52 (e.g., due to non-integer level scaling and/or shifts in pixel locations during scaling).

Figure 13:
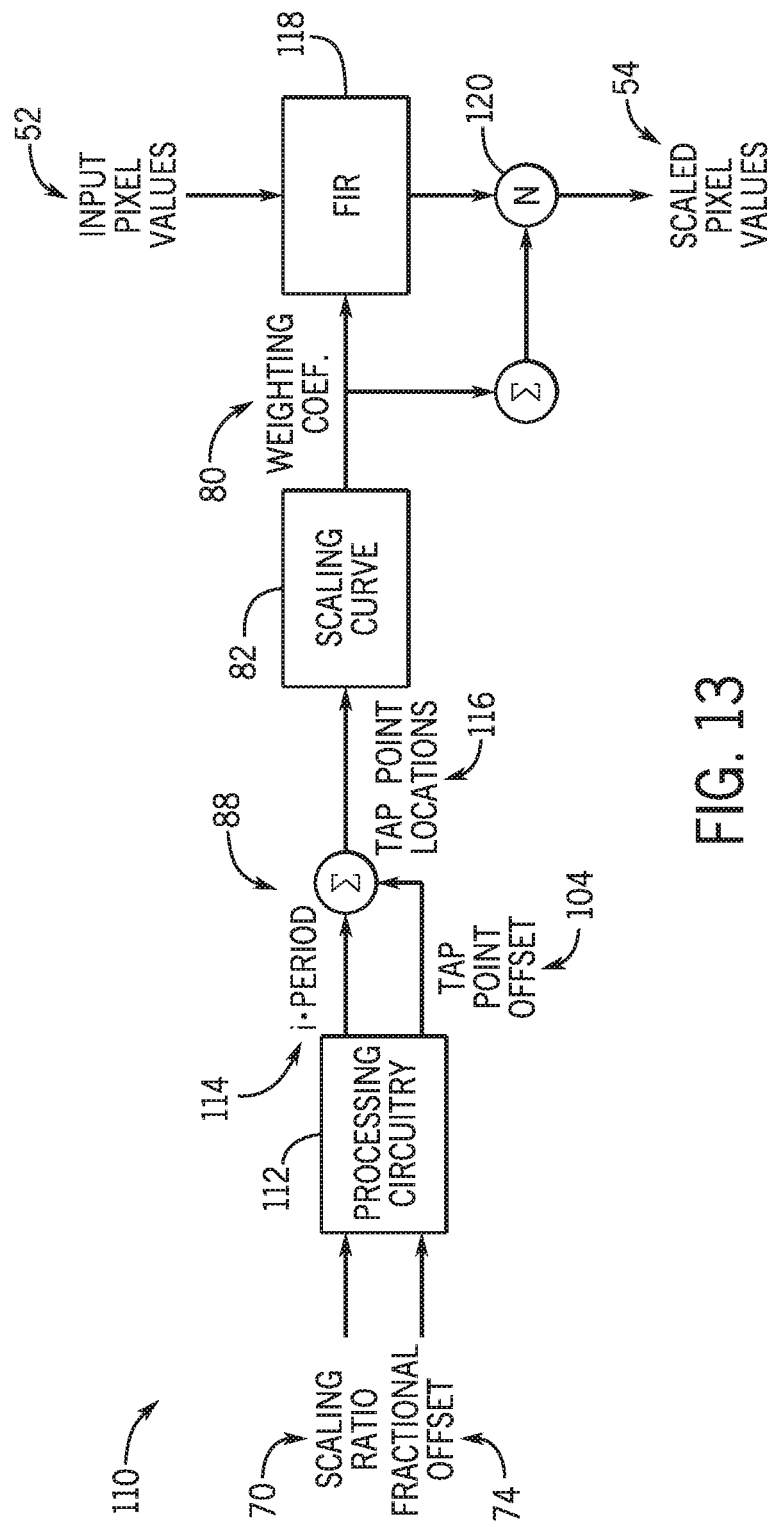
FIG. 13 is a diagrammatical flowchart of a portion of the variable scaling block of FIG. 6, in accordance with an embodiment.

To help further illustrate, FIG. 13 is a diagrammatical flowchart of a portion 110 of the variable scaling block 50. In some embodiments, the variable scaling block 50 may receive input pixel values 52, a desired scaling ratio 70 corresponding to the input pixel values 52, and a fractional offset 74 corresponding to the scaled pixel location (e.g., pixel location 72 or 76). The variable scaling block 50 may also include processing circuitry 112 that may determine the tap point offset 104 (e.g., from the scaling ratio 70 and the fractional offset 74). In some scenarios, the tap point offset 104 may be determined as zero or not calculated if, for example, the scaled pixel location is aligned with the input pixel locations 64. In some embodiments, the processing circuitry 112 may also determine the period 88 of the tap points 86 based on the scaling ratio 70. Additionally, the processing circuitry 112 may calculate preliminary (e.g., without a tap point offset 104) locations of the tap points 86 (e.g., relative to the normalized phase metric 90) by indexing the periods 88. For example, an index 114 counting through a range of a number of tap points 86 may be multiplied by the periods 88 to obtain the preliminary locations of the tap points 86. The preliminary locations may then be offset by the tap point offset 104 to determine the tap point locations 116. Further, the tap point locations 116 may be used in conjunction with the scaling curve 82 to determine the weighting coefficients 80. As should be appreciated, the processing circuitry 112 may combine multiple processes and/or directly calculate the tap point locations 116 and/or weighting coefficients 80 from the scaling ratio 70 and the fractional offset 74. Moreover, in some embodiments, the scaling curve 82 may be implemented as a LUT, an equation stored in memory, or other data structure. The weighting coefficients 80 may be used to weight input pixel values 52, for example, using a finite impulse response filter (FIR) 118 or other aggregation circuitry, and the weighted pixel values may undergo normalization via normalization circuitry 120, for example, using a sum of the weighting coefficients 80 to generate the scaled pixel values 54. As should be appreciated, any suitable aggregation circuitry such as the FIR 118, multiplication circuitry, and/or filter circuitry may be used to combine the weighting coefficients 80 with the input pixel values 52. For example, aggregation circuitry may multiply input pixel values 52 by their respective weighting coefficients 80 and sum the respective results. In some embodiments, the weighting coefficients 80 may undergo normalization prior to being combined with the input pixel values 52 and/or may be pre-normalized within the scaling curve 82. Moreover, the variable scaling block 50 may use any suitable method for combining the weighting coefficients 80 with the input pixel values 52 to generate the scaled pixel values 54.

Figure 14:
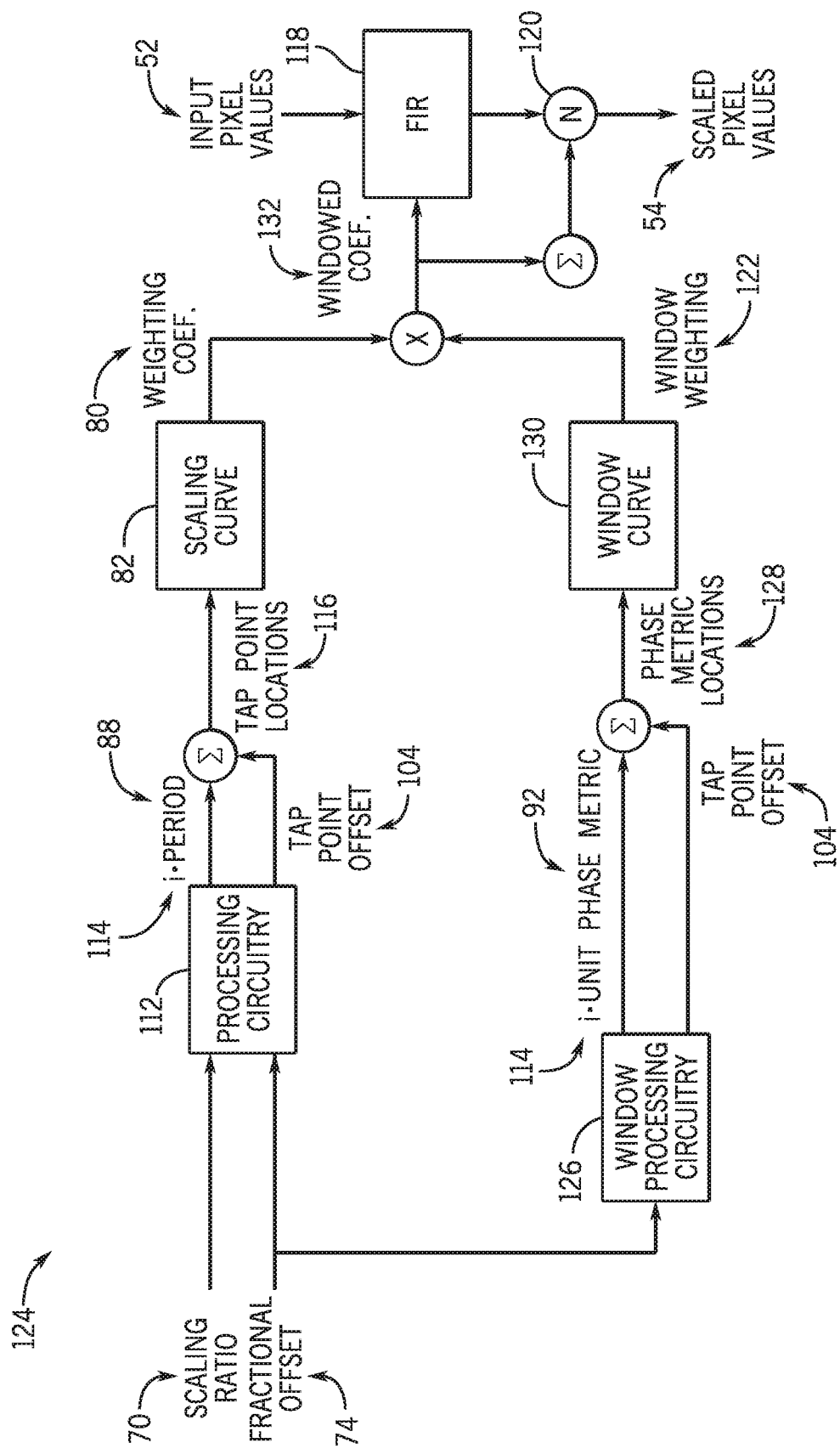
FIG. 14 is a diagrammatical flowchart of a portion of the variable scaling block of FIG. 6, in accordance with an embodiment.

As discussed above, the period 88 associated with upsampling or resampling may be capped at the unit phase metric 92. Moreover, for scaling ratios 70 less than one, the period 88 may decrease, which may utilize less of a window (e.g., a narrow portion) of the scaling curve 82. As such, in some embodiments, the scaling curve 82 may be weighted by windowing the scaling curve 82 relative to the normalized phase metric 90. As discussed above, the period 88 between the tap points 86 may vary depending on the scaling ratio 70. As such, for a given number of tap points 86, the window of the scaling curve 82 encompassing the tap points for downsampling may be smaller (e.g., narrower). In some scenarios, smaller downsampling scaling ratios 70 may incur a degradation of frequency response as compared to higher scaling ratios 70 due to the differences in windowing. As such, in some embodiments the variable scaling block 50 may generate a window weighting 122 as shown in the portion 124 of the variable scaling block 50 of FIG. 14. The variable scaling block 50 may include window processing circuitry 126 to determine the tap point offset 104 and intermediate phase metric locations (e.g., via multiplying the index 114 counting through the range of the number of tap points 86 by the unit phase metric 92 to obtain the preliminary phase metric locations that may be offset via the tap point offset 104 to generate the phase metric locations 128. In a similar way to determining the weighting coefficients 80 via the scaling curve 82, the window weightings 122 may be determined based on the window curve 130. As should be appreciated, the window processing circuitry 126 may combine multiple processes and/or directly calculate the phase metric locations 128 and/or the window weighting 122 from the fractional offset 74 and/or the scaling ratio 70. Moreover, in some embodiments, the window curve 130 may be implemented as a LUT, an equation stored in memory, or other data structure. Furthermore, the window processing circuitry 126 may be implemented with and/or integrated with the processing circuitry 112, and, in some embodiments, the scaling curve 82 and the window curve 130 may share a combined data structure such as a double LUT. The window weighting 122 may be combined with the weighting coefficients 80 to generate windowed coefficients 132, which may be used to weight the input pixel values 52 (e.g., via a FIR 118 or other aggregating circuitry). The weighted input pixel values 52 may then undergo normalization (e.g., via normalization circuitry 120), if applicable, to generate the scaled pixel values 54. As such, the scaling curve 82 may be weighted based on a variable or fixed weighting function or envelope (e.g., the window curve 130) to decrease the likelihood of frequency response degradation and the likelihood of perceivable artifacts.

As discussed above, the variable scaling block 50, with or without windowing, may operate in a single dimension (e.g., providing 1-dimensional filtering) or may be extended to multiple (e.g., two or three) different directions/dimensions. For example, the scaling block 50 may perform scaling in the vertical direction and then perform scaling in the horizontal direction, or vice versa. Moreover, the scaling ratio 70 used in different directions may be different. For example, the scaling ratio 70 horizontally may be different from the vertical scaling ratio 70 for the same portion of input pixel values 52. Additionally, in some embodiments, the variable scaling block 50 may operate diagonally, and/or interpolate (e.g., via a weighted average) between multiple directions.

Although the above referenced flowcharts are shown in a given order, in certain embodiments, process/decision blocks may be reordered, altered, deleted, and/or occur simultaneously. Additionally, the referenced flowcharts are given as illustrative tools and further decision and process blocks may also be added depending on implementation.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device comprising:
an electronic display configured to display an image based on scaled image data; and
variable scaling circuitry configured to generate the scaled image data, wherein generating the scaled image data comprises:
receiving a first plurality of input pixel values in a first resolution;
determining a plurality of tap point locations based at least in part on a scaling ratio to be applied to the first plurality of input pixel values;
determining a plurality of weighting coefficients based at least in part on a scaling curve and the plurality of tap point locations;
weighting the first plurality of input pixel values based at least in part on the plurality of weighting coefficients; and
generating a first scaled pixel value at a second resolution based at least in part on an aggregation of the weighted first plurality of input pixel values, wherein the scaled image data comprises the first scaled pixel value.

2. The electronic device of claim 1, wherein generating the scaled image data comprises generating a second scaled pixel value at a third resolution different from the second resolution, wherein the scaled image data comprises a single frame of image data, wherein the scaled image data comprises the first scaled pixel value and the second scaled pixel value.

3. The electronic device of claim 1, wherein a period of the plurality of tap point locations is directly proportional to the scaling ratio.

4. The electronic device of claim 1, wherein the variable scaling circuitry comprises processing circuitry configured to determine a tap point offset based at least in part on a fractional offset, wherein the fractional offset comprises a distance from an axis of an input pixel location of the first plurality of input pixel values, wherein the plurality of tap point locations are determined based at least in part on the tap point offset.

5. The electronic device of claim 4, wherein the plurality of tap point locations are determined based at least in part on a range of index values, wherein the processing circuitry is configured to determine a plurality of tap point offsets, wherein first tap point offsets of the plurality of tap point offsets associated with an even index value of the range of index values are determined differently than second tap point offsets of the plurality of tap point offsets associated with an odd index value of the range of index values.

6. The electronic device of claim 1, wherein the scaling curve comprises a look-up-table.

7. The electronic device of claim 1, wherein the variable scaling circuitry comprises a finite impulse response filter configured to weight the first plurality of input pixel values with the plurality of weighting coefficients.

8. The electronic device of claim 1, wherein the plurality of weighting coefficients is normalized by a respective plurality of window weightings.

9. The electronic device of claim 8, wherein the variable scaling circuitry is configured to determine the respective plurality of window weightings based at least in part on a fractional offset of the first scaled pixel value.

10. The electronic device of claim 1, wherein the second resolution is greater than the first resolution, wherein a period of the plurality of tap point locations is capped by a unit phase metric.

11. Variable scaling circuitry comprising:
  processing circuitry configured to determine a plurality of tap point locations based at least in part on a scaling ratio, wherein the scaling ratio comprises a multiplier between a first resolution of a plurality of input pixel values and a second resolution of a scaled pixel value different from the first resolution;
  memory comprising a scaling curve configured to convert the plurality of tap point locations into a respective plurality of weighting coefficients; and
  aggregation circuitry configured to combine the plurality of input pixel values with the respective plurality of weighting coefficients, wherein the scaled pixel value is based at least in part on the combination of the plurality of input pixel values with the respective plurality of weighting coefficients.

12. The variable scaling circuitry of claim 11, comprising a window curve configured to normalize a window of the scaling curve.

13. The variable scaling circuitry of claim 11, comprising normalization circuitry configured to normalize the combination of the plurality of input pixel values with the respective plurality of weighting coefficients by a sum of the respective plurality of weighting coefficients.

14. The variable scaling circuitry of claim 11, wherein each of the plurality of tap point locations are separated by a constant period.

15. The variable scaling circuitry of claim 14, wherein the first resolution is greater than the second resolution, wherein the constant period is directly proportional to the scaling ratio.

16. A method comprising:
  receiving a first plurality of input pixel values of an image frame in a first resolution;
  receiving a second plurality of input pixel values of the image frame;
  determining a first plurality of weighting coefficients based at least in part on a scaling curve and a scaling ratio between the first resolution and a second resolution;
  determining a second plurality of weighting coefficients based at least in part on the scaling curve and the scaling ratio;
  weighting the first plurality of input pixel values based at least in part on the first plurality of weighting coefficients;
  weighting the second plurality of input pixel values based at least in part on the second plurality of weighting coefficients;
  generating a first scaled pixel value of the image frame at the second resolution based at least in part on a first aggregation of the weighted first plurality of input pixel values; and
  generating a second scaled pixel value of the image frame at the second resolution based at least in part on a second aggregation of the weighted second plurality of input pixel values.

17. The method of claim 16, comprising:
  determining a first plurality of tap point locations based at least in part on the scaling ratio and a first fractional offset of the first scaled pixel value, wherein the first plurality of weighting coefficients is determined based at least in part on the first plurality of tap point locations; and
  determining a second plurality of tap point locations based at least in part on the scaling ratio and a second fractional offset of the second scaled pixel value, wherein the second plurality of weighting coefficients is determined based at least in part on the second plurality of tap point locations.

18. The method of claim 17, wherein determining the first plurality of tap point locations comprises determining a period of the first plurality of tap point locations based at least in part on the scaling ratio.

19. The method of claim 16, wherein generating the first scaled pixel value comprises normalizing the first aggregation of the weighted first plurality of input pixel values.

20. The method of claim 16, wherein the first plurality of weighting coefficients is normalized by a respective plurality of window weightings, the method comprising determining the respective plurality of window weightings based at least in part on a fractional offset of the first scaled pixel value.

* * * * *